United States Patent [19]
Stolzer

[11] 4,165,068
[45] Aug. 21, 1979

[54] DEVICE FOR CLAMPING A WORKPIECE

[75] Inventor: Paul Stolzer, Achern, Fed. Rep. of Germany

[73] Assignee: Keuro GmbH & Co., KG., Achern, Fed. Rep. of Germany

[21] Appl. No.: 874,292

[22] Filed: Feb. 1, 1978

[30] Foreign Application Priority Data

Feb. 2, 1977 [DE] Fed. Rep. of Germany ... 7702902[U]

[51] Int. Cl.[2] ............ B23Q 3/02
[52] U.S. Cl. ............ 269/136
[58] Field of Search ............ 269/134–138

[56] References Cited

U.S. PATENT DOCUMENTS 1,457,307 6/1923 Kerns ............ 269/136

FOREIGN PATENT DOCUMENTS 971458 1/1951 France ............ 269/138

*Primary Examiner*—Robert C. Watson
*Attorney, Agent, or Firm*—Edwin E. Greigg

[57] ABSTRACT

The invention relates to a device for clamping a workpiece lying on the table of a machine tool by means of two jaws, at least one of which is displaceable, said jaws being provided with mutually opposed parallel clamping surfaces, at least one of which is displaceable by a predetermined amount in the direction toward the table and parallel to its jaw.

6 Claims, 3 Drawing Figures

1
2
4
5
6
7
8
9
10
13
14
15
16
17
18

DEVICE FOR CLAMPING A WORKPIECE

BACKGROUND OF THE INVENTION

In clamping devices of the aforesaid type, the situation arises that the workpiece, on being clamped, may be raised somewhat from the work table due to the play of the jaws in their guides and/or may lose its intended position on the work table. To solve this problem, the known clamping devices of the aforementioned type have to resort to relatively expensive constructional and structural means, resulting in the devices becoming complicated, bulky and correspondingly costly. Their maintenance must also fulfill many special requirements.

In cold sawing machines, particularly in power hacksaws, it is not previously known to use clamping devices of the kind referred to herein. This has, however, the drawback that in, for example, cutting lengths from bar stock the raising of the workpiece from the worktable during clamping leads to the cutting face being inclined from the desired plane. This runs counter to the continually increasing endeavors to saw off sections which need no reworking before further processing.

Particularly undesirable consequences arise, however, when the cold saw is provided with a feed device in the form of feed jaws arranged in series with the clamping jaws in the feed direction of the material to be sawn, which feeding jaws grip, e.g. rod-shaped material during the sawing process, feed it forward after the sawing process and after the opening of the clamping jaws, then release it at the beginning of the sawing process and after an adjustable return stroke, grip the material again. Namely, in this case the workpiece has no opportunity to fall back onto the work table on opening of the clamping jaws. Rather it is raised somewhat higher with each clamping step and therefore wanders higher step by step between the clamping jaws.

OBJECT AND SUMMARY OF THE INVENTION

The object of the present invention is therefore to provide a cold sawing machine with a clamping device of the type referred to in the opening paragraph of this application which is so formed that there is no noteworthy additional space requirement, which is constructionally simple and which poses no maintenance problems and of which the initial cost is not significant.

According to this disclosure, this problem is solved in that (1) parallel to the table and to the displaceable clamping surfaces at least one shaft is rotatably journalled in a clamping jaw which is associated therewith, (2) that the shaft is provided with at least one section which is positively affixed to the clamping surface and is eccentric with respect to the shaft, (3) that the shaft is offset with respect to the shaft in the direction toward the clamping surface and eccentrically to the table, (4) that the clamping surface is displaceable on the clamping jaw against a restoring spring force and (5) in that not only the spring-force-determined but also the clamping-force-determined displacement of the clamping surface is limited. In this connection, it is appropriate to provide two such shafts in the clamping jaw.

It is advantageous for the shafts to be provided with the eccentric sections in the form of pins which project on both sides through the clamping jaws and for the pins to engage in corresponding bores of cheeks which are affixed to the clamping surface and laterally overlap the clamping jaws.

The spring force may be provided by two Belleville spring assemblies and arranged to act on the clamping surface through pressure bolts which are horizontal displaceable in the direction toward the clamping surface.

Finally, the limit for the clamping-force-determined displacement of the clamping surface may be the clamping jaw and the limit for the spring-force-determined displacement of the clamping surface may be the relaxed position of the Belleville spring assemblies.

These measures according to this invention have the effect that in the affected clamping jaw only the bores for the shafts provided with eccentrics are to be formed and these shafts to be fitted, which usually present simple base parts for a turning operation. The clamping surface is then journalled on the eccentric pins through their cheeks, which laterally overlap the clamping jaw. As the eccentrics are offset with respect to the shaft in the direction toward the clamping surface and to the table, on clamping of the jaws against the workpiece there occurs a movement of the clamping surface directed against the restoring spring force and toward the associated clamping jaw, whereby simultaneously the clamping surface is displaced, also in the direction toward the work table, by the eccentric-determined turning movement of the shafts, the workpiece being thereby clamped against the work table.

The invention will be better understood as well as further objects and advantages thereof become more apparent from the ensuing detailed description of a preferred embodiment taken in conjunction with the drawings.

DESCRIPTION OF THE PREFERRED EMBODIMENT

Figures 1, 1A:
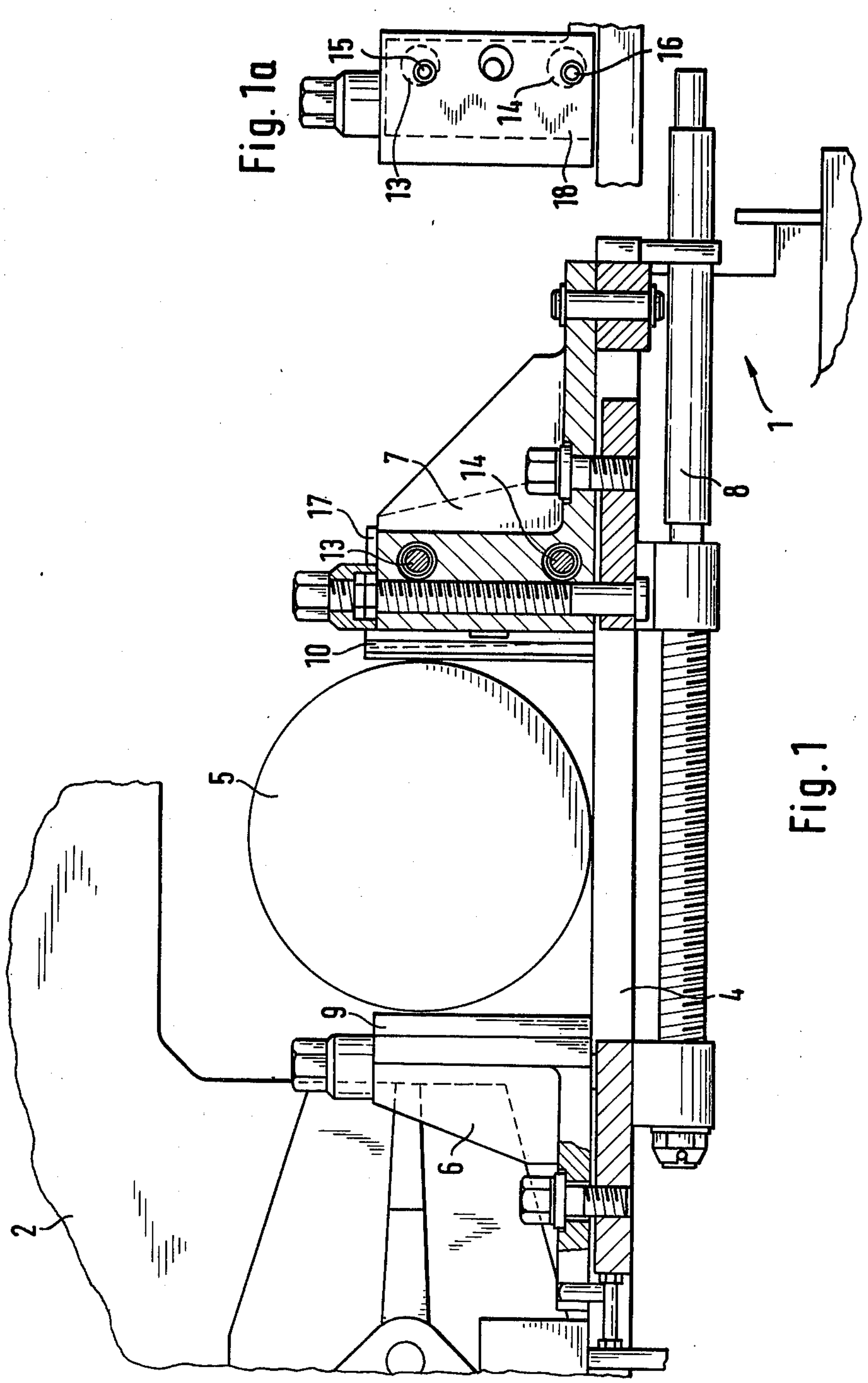
FIG. 1 is a side elevational view partially in section of a clamping device according to this invention.
FIG. 1*a* is a fragmentary view of the eccentric elements not shown in FIG. 1.
Figure 2:
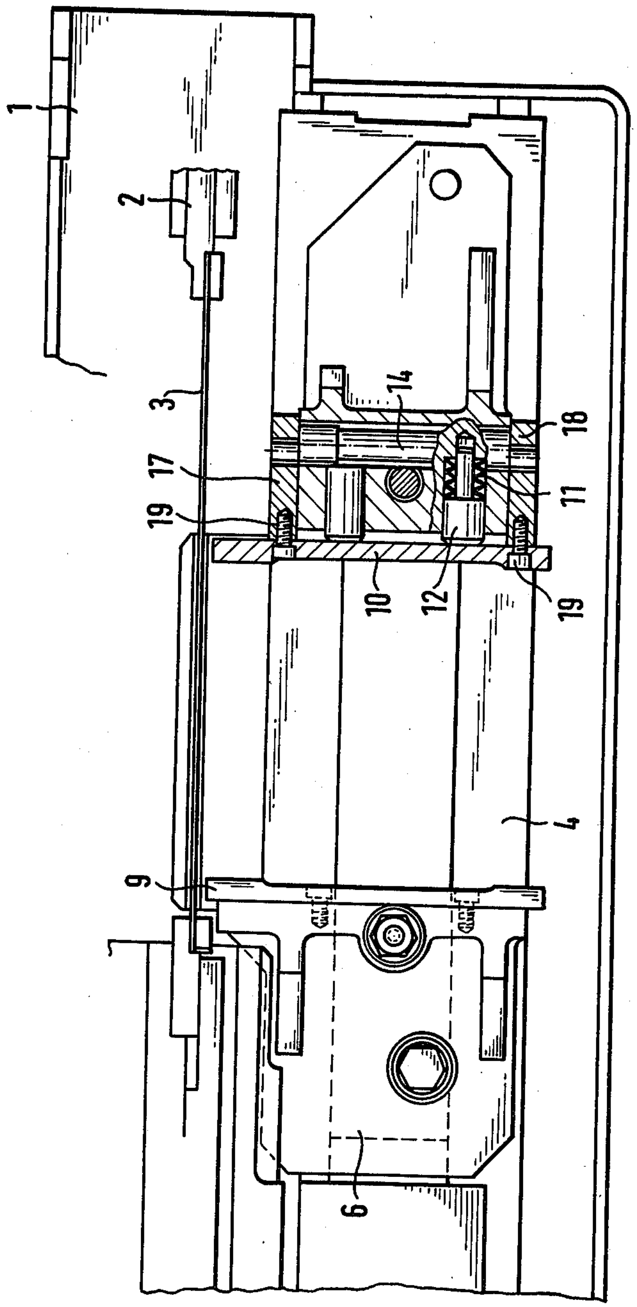
FIG. 2 is a top plan view of the clamping device.

The drawings show part of a power hacksaw with a main frame 1 and a saw frame 2, in which is clamped a saw blade 3.

The main frame 1 provides a work table 4, on which lies a piece of round-section material 5 which is to be sawn, this material 5 being clamped between jaws 6 and 7, of which at least one is displaceably arranged on the main frame 1. The displacement is usually achieved by a threaded spindle 8 which abuts the main frame 1.

The jaws 6 and 7 have parallel mutually opposed clamping faces 9 and 10, by means of which they come into contact with the workpeice 5. In the case shown in the drawings, the clamping face 10 can be adjusted with respect to its jaw 7 by the operation of the clamping force in a direction toward the work table 4 and the jaw 7 can be adjusted against the operation of restoring Belleville spring assemblies 11. Thus, the Belleville spring assemblies abut on the one side the jaw 7 and on the other side, the clamping surface 10, through horizontally displaceable pressure bolts 12 provided therein. For the achievement of clamping-force-controlled displacement movement of the clamping plate 10, two shafts 13 and 14 are rotatably journalled in the jaw 7, one above the other, which shafts project laterally from the jaw 7 by means of eccentric pins 15 and 16. (See FIG. 1*a*) The jaw 10 overlaps the clamping surface 7 laterally by means of cheeks 17 and 18, each of which are provided with bores for the engagement of the eccentric pins 15 and 16.

The eccentricity of the pins 15 and 16 with respect to the axis of the axles 13 and 14 is offset on the one hand in the direction toward the clamping surface 10 and on the other hand in the direction toward the work table 4.

For simplicity in assembly, the cheeks 17 and 18 are releasably fixed to the clamping surface 10 by means of screws 19.

OPERATION

When the workpiece 5 is clamped between the jaws 6 and 7 of a clamping device as described above, it first comes into contact with the clamping surface 9 and 10.

During the subsequent increase of the clamping force, the clamping face 10 is pressed in a direction toward the jaw 7 against the operation of the Belleville spring assemblies 11. This, however, leads, through the eccentric pins 15 and 16, simultaneously to an adjustment movement in the direction toward the work table 4, i.e. downward in FIG. 1. This is because the eccentrics 15 and 16 are so arranged that the shafts 13 and 14 rotate counterclockwise in FIG. 1 under the clamping force. Accordingly, when it is thus clamped, the workpiece 5 is pulled against the work table 4. On release and opening of the jaws 6 and 7 there occurs an opposite, restoring movement due to the operation of the Belleville spring assemblies 11.

So that on clamping of the workpiece 5, the eccentrics 15 and 16 do not, with reference to FIG. 1*a*, reach or quite pass the lowest point of their conceivable turning movement, the separation between the clamping face 10 and the front side of the jaw 7, which faces this clamping face, is so determined that the clamping face 10 comes into abutting contact with the jaw 7 beforehand. Furthermore, on opening of the jaws 6 and 7, the reverse movement of the clamping face 10 which takes place due to the operation of the Belleville spring assemblies 11 is so limited by the maximum extensibility of the Belleville spring assemblies 11 that the eccentric pins 15 and 16, with reference to FIG. 1*a*, do not reach the furthest conceivable leftward position to which they might turn, and thus do not come into such a position as would block turning of the shafts 13 and 14 if the workpiece were to be clamped once more.

The foregoing relates to a preferred exemplary embodiment of the invention, it being understood that other embodiments and variants thereof are possible within the spirit and scope of the invention, the latter being defined by the appended claims.

What is claimed and desired to be secured by letters patent of the United States is:

1. A device for clamping a workpiece on a table of a machine tool by means of mutually opposed parallel clamping surfaces at least one of which is displaceable by a predetermined amount and in a direction toward the opposed clamping surface, further characterized wherein shaft means are rotatably journalled in said displaceable clamping surface, said shaft means arranged one above the other and include means cooperative with eccentric means for directive force application toward said opposed clamping surface and said table and spring loaded means associated with said displaceable clamping surface adapted to control clamping forces and release of said workpiece.

2. A device according to claim 1, further characterized wherein said shaft means are associated with said eccentric means in the form of pin means which project laterally beyond said displaceable clamping jaw, and that the said pins are arranged to engage in corresponding bores of cheek means which are affixed to said displaceable clamping surface.

3. A device according to claim 2, further characterized wherein at least one cheek is releasably affixed to said displaceable clamping surface.

4. A device according to claim 1, further characterized wherein said spring loaded means comprises a pair of Belleville spring assemblies.

5. A device according to claim 1, further characterized wherein said displaceable clamping surface further includes a jaw means.

6. A device according to claim 1, further characterized wherein said spring loaded means comprise a pair of Belleville spring assemblies that limit displacement of said displaceable clamping surface.

* * * * *